Patented Apr. 16, 1940

2,197,724

UNITED STATES PATENT OFFICE 2,197,724

RESINOUS MOLDING COMPOSITION FROM SYNTHETIC ALDEHYDE RESINS AND HYDROLYZED LIGNO-CELLULOSE

Almon G. Hovey, Pleasant Ridge, and Theodore S. Hodgins, Royal Oak, Mich., assignors to Reichhold Chemicals, Inc., Detroit, Mich.

No Drawing. Application July 26, 1939, Serial No. 286,728

4 Claims. (Cl. 260—9)

The invention relates to a resinous composition suitable for molding purposes having as a starting material, or principal reacting ingredient, an acid hydrolyzed ligno-cellulose or wood product such as is described in U. S. Patent No. 1,932,255 Sherrard et al., dated October 24, 1933, the present invention being in the nature of an improvement on the process and product described therein. Reference is also made to U. S. Patent No. 2,130,783 Sherrard et al., dated September 20, 1938, and U. S. Patent No. 2,156,159 Olson et al., dated April 25, 1939.

Cheap molding compounds have been described in technical literature in which forest waste, such as sawdust and wood chips made from small trees or branches, or agriculture waste such as bagasse, are treated with acid to produce a lignin resin which, upon drying in the presence of the cellulose fibres, makes a low cost molding powder, but one which does not have much strength, nor good moisture resistance, nor good electrical properties. The flow and strength have been increased by the addition of aniline and/or additional furfural.

It is also known to utilize resin-forming ingredients as a binding agent in the preparation of artificial lumber and the like from waste woody or cellulosic materials where such materials are employed in the raw state without having been digested or chemically treated.

According to our process we incorporate resin forming ingredients with acid hydrolyzed ligno-cellulose, such as wet bagasse or hydrolyzed wood, and co-condense said resin forming ingredients with the wet lignin product, preferably in a steam heated dough mixer. Our process is a wet process and is characterized by condensing the resin at the same time that the wet bagasse or hydrolyzed wood is being dried. By the use of this process we obtain improved dispersing and wetting of the cellulose, using minimum quantity of resin as compared with prior processes in this field. The resin-forming ingredients may be of various types but are preferably those employed in the preparation of thermo-setting aldehyde resins such as phenol formaldehyde, phenol furfural, urea-formaldehyde and urea furfural resins. The invention will be further described by reference to the use of several different forms of resin forming ingredients.

*Use of phenolic resin forming ingredients—*
*Example 1*

We have found that a very substantial improvement in the final product can be made by incorporating substantially 3.3 pounds of phenol, 3.8 pounds of formaldehyde, .18 pound of ammonia, .092 pound of barium hydroxide, 3 pounds of water, with 10 pounds of the acid hydrolyzed wood or lignin resin cellulose product described in Patent No. 1,932,255. These ingredients may be incorporated into a steam-heated dough-mixer and the resin-forming ingredients co-condensed with the lignin resin, which is present on the cellulose fibres from the acid treatment of the wood chips. The results obtained by this co-condensation is much better than a simple admixture of the finished phenolic resins of composition corresponding to the ingredients used herein, because there is greater uniformity on account of the interaction or reaction of resin-forming ingredients with the lignin resin, and it is found that greater strength thereby results. In this process, the temperature of the reaction mixture in the presence of the lignin resin-treated cellulose is raised to approximately 80° C. in the course of about one hour, and then a 25″ vacuum or better is applied in the dough-mixer to evaporate the water and further advance the resin on the cellulose fibres, and to homogenize the phenolic resin with the lignin resin which has been formed in situ.

Instead of employing the cellulose product described in Patent No. 1,932,255 as the starting material, other acid hydrolyzed cellulosic material may be employed, as for example, the product of U. S. Patent No. 2,156,159, or wet hydrolyzed bagasse may be employed as the starting material to which the resin forming ingredients are to be added.

When colors are desired other than the light, pastel shades, it is also of advantage to incorporate during the later stages of resinification, a wet pulp paste of color, provided that the pigments employed are not of such a character as to affect in a detrimental way the maturing of the resin. By this procedure the main vacuum drying operation in the dough-mixer or in other suitable apparatus performs the functions of drying the lignin resin-cellulose mixture, advancing the phenolic resins, dehydrating the resin while at the same time drying out the pulp color and dispersing it in the resin-filler mixture. Thus, according to the present process, one drying operation takes the place of two drying operations in the case of uncolored molding powder, and in the case of colored molding powder, one drying operation can take care of the drying of the lignin wood powder, the drying of the phenolic resins, and the drying out of the pigment paste, in addition to dispersing all three in a much more homogeneous way than if they were ground dry in a ball mill. If a solvent were to be introduced to effect efficient mixing, it would of course be an expensive way to blend the alcohol-soluble phenolic resins into the molding powder. Thus, in our process, not only does one drying operation take the place of two or three drying operations, but the mixing is much more efficient than by customary methods.

With regard to the phenolic resins, it is to be understood that different phenols and tar acids may be used to replace the phenol and that furfural and other aldehydes may be used to replace the formaldehyde. Furfural is an especially good aldehyde component, particularly from the standpoint of chemurgy, and from the fact that it readily reacts with lignin resin, and promotes good flowing properties in the mold.

The addition of the phenolic resin, as described in the foregoing specific example, not only increases the tensile strength, shock resistance, moisture resistance, and moisture absorption of the product but also greatly increases the dielectric strength of such product.

Example 2

2000 parts by weight of wet acid hydrolyzed bagasse, having a moisture content of approximately 50%, are loaded into a steam heated dough mixer of the Werner and Pfleiderer type (1000 parts by weight net non-volatile content), and 2500 parts by weight of water added as kneading takes place. When well mixed, 300 parts by weight of phenol, 180 parts by weight of formaldehyde (aqueous 37%) and 15 parts by weight of 26% aqueous ammonia are added in the order mentioned. By the use of steam in the jacket, the mixing is continued and heating allowed to take place with the action of a reflux condenser. After this is held at 60° C. ±2° C. for 1 hour, the reaction mixture is taken on up to boiling at the rate of 1° C. per minute, cooling, if necessary, by circulating water in the jacket, to keep the reaction mixture under control. The reaction mixture is held at boiling (approximately 100° C.) for 10 minutes under the action of a reflux condenser; then, at the end of this time, dehydration under vacuum is commenced. The water is drawn off under the action of a vacuum pump and caught in a trap which is a self-measuring device. By checking the amount of water drawn off by the vacuum pump against the theoretical losses, it is possible to gauge very accurately the extent of the advancement of the resin and of the dehydration of the resin and wet bagasse. The temperature of the reaction mixture decreases as the vacuum process proceeds, and generally ends up at about 50° C. when the powder is finally dried out. It is necessary that the temperature be quite low, that is, around 50–70° C. at the conclusion of the dehydration process, otherwise there is a great tendency to advance the resin too far so that it is either over into the insoluble "resite" state, or too fast in curing for molding purposes.

The phenol, formaldehyde and ammonia, in the same proportions may be partially reacted to a watery, resinous sludge before introducing it into the wet bagasse. This, of course, has the disadvantage of requiring two reaction vessels, that is a resin kettle as well as a dough mixer. On the other hand, by making a resinous sludge by pre-reacting to a partial extent the resin forming ingredient before introducing them into the dough mixer, the resin yield of the compound seems to be higher even when the same amounts of material are used because the formaldehyde is tied up better. In either case, however, the advantages of the co-condensation and advancement of the resin together with the lignin component of the hydrolyzed wood not only gives more economical process than by mixing the two ingredients either in dry form or in solvent form, but also better flow is obtained by our process. We believe this is due to better dispersion, but even more so to co-condensation of the resin forming components with the lignin. When pulp colors are introduced, the economy is even greater.

Use of urea-formaldehyde resin forming ingredients

Urea-formaldehyde resins may be incorporated in a similar manner, that is, by reacting the urea, formaldehyde, and catalyst in the presence of the wood flour, using an excess of water as a reacting medium, and co-condensing the lignin resin with the urea-formaldehyde complex. The "crazing", commonly known to urea-formaldehyde molding resin compounds, may be reduced or eliminated by co-condensation of the urea-formaldehyde resins with the lignin resin. The color is slightly improved over the phenol-formaldehyde co-condensation products with lignin, but the staining effect of the lignin resin itself on the urea-formaldehyde resin comprises a drawback in the molding of pastel shades, unless a bleaching operation is performed.

Use of urea furfural resin forming ingredients—Example 3

2000 parts by weight of acid hydrolyzed bagasse, having a net non-volatile content of 1000 parts by weight, are mixed in a Werner and Pfleiderer dough mixer with 2000 parts by weight of water, and then 77 parts by weight of urea, 124 parts by weight of furfural, and 0.64 part by weight of potassium hydroxide are added in the order given. By means of a steam jacket, the reaction mixture may be brought up to boiling in 20 minutes during the agitation. After 2 hours refluxing at boiling, dehydration under vacuum is carried on until the powder is dry. The result is a dark brown molding powder which is characterized by very good flow in the mold when molded 4 minutes at 160–170° C. The flow and general appearance are much improved over a compound made from dry acid hydrolyzed bagasse, 80%, and 20% of a urea-furfural resin, according to the same composition.

We claim:

1. A process of producing a resinous molding composition which comprises partially co-condensing the ingredients of thermo-setting synthetic aldehyde resins selected from a group consisting of phenol-aldehyde and urea-aldehyde resins with the lignin component of wet hydrolyzed ligno-cellulose, and subsequently dehydrating the product and forming and advancing the resin by vacuum treatment to a point where the product is substantially dry but is still capable of being converted by heat and pressure into an infusible insoluble molded article.

2. A process as set forth in claim 1, wherein the resin-forming ingredients comprise a phenol and an aldehyde.

3. A process as set forth in claim 1, wherein the resin-forming ingredients comprise urea and an aldehyde.

4. A resinous molding composition produced according to claim 1.

THEODORE S. HODGINS.
ALMON G. HOVEY.